United States Patent [19]

James et al.

[11] Patent Number: 5,756,962
[45] Date of Patent: May 26, 1998

[54] LASER-PROCESSING HEAD FOR LASER PROCESSING APPARATUS

[75] Inventors: William A. James, Long Branch; Stephen H. Breitkopf, North Brunswick, both of N.J.; Robert H. Kirchhoff, Amherst, Mass.; Robert G. Provell, Spotswood, N.J.

[73] Assignee: McNeil - PPC, Inc., Skillman, N.J.

[21] Appl. No.: 631,627

[22] Filed: Apr. 8, 1996

Related U.S. Application Data

[63] Continuation of Ser. No. 284,339, Aug. 2, 1994, abandoned.

[51] Int. Cl.$^6$ ................................................ B23K 26/14
[52] U.S. Cl. .......................... 219/121.75; 219/121.6; 219/121.84
[58] Field of Search ........................ 219/121.6, 121.67, 219/121.72, 121.75, 121.84, 121.85

[56] References Cited

U.S. PATENT DOCUMENTS

| | | | |
|---|---|---|---|
| 4,315,133 | 2/1982 | Morgan et al. | 219/121.84 |
| 4,461,947 | 7/1984 | Ward | 219/121.84 |
| 4,467,171 | 8/1984 | Ramos | 219/121.67 |
| 4,518,843 | 5/1985 | Antol et al. | 219/121.84 |
| 4,555,610 | 11/1985 | Polad et al. | 219/121.84 |
| 4,728,771 | 3/1988 | Sartorio | 219/121.67 |

FOREIGN PATENT DOCUMENTS

| | | | |
|---|---|---|---|
| 3814985 | 12/1988 | Germany | 219/121.84 |
| 59-163093 | 9/1984 | Japan | 219/121.67 |
| 61-296990 | 12/1986 | Japan | 219/121.75 |
| 62-21495 | 1/1987 | Japan | 219/121.84 |
| 62-72495 | 4/1987 | Japan | 219/121.6 |
| 62-224489 | 10/1987 | Japan | 219/121.84 |
| 3-66490 | 3/1991 | Japan | 219/121.84 |
| 5-185265 | 7/1993 | Japan | 219/121.6 |
| 2233114 | 1/1991 | United Kingdom | 219/121.75 |

*Primary Examiner*—Teresa J. Walberg
*Assistant Examiner*—Gregory L. Mills

[57] ABSTRACT

An improved laser processing head comprising a housing, a lens holder-nozzle mounted within the housing and a gas distributor for introducing gas adjacent a focusing lens retained within the housing to cool the lens and prevent the lens from becoming contaminated or damaged from material ablated from the workpiece. The gas distributor is comprised of a plurality of angled distribution slots that creates a vortex gas flow action directed away from the face of the lens and towards the nozzle outlet.

17 Claims, 4 Drawing Sheets

LASER-PROCESSING HEAD FOR LASER PROCESSING APPARATUS

This is a continuation of application(s) Ser. No. 08/284,339 filed on Aug. 2, 1994 now abandoned.

BACKGROUND OF THE INVENTION

1. Field of the Invention

The present invention is directed to laser processing heads and more particularly to an improved laser processing head suitable for use in the high power ablation, cutting or drilling of materials such as plastic and metal.

2. Discussion of the Prior Art

Laser processing is well known in the machine tool and printing industries. Laser processing is used to cut and/or ablate materials.

A laser processing head typically includes a focusing lens mounted in a generally cylindrical housing. The focusing lens may be retained in the housing by the use of a pair of retaining rings, one on either side of the lens. The laser processing head also typically includes a nozzle which is attached to the housing at one end thereof. The nozzle has a narrow opening through which the focused laser beam passes as it exits the processing head prior to impinging on the workpiece. In use, a laser beam is directed through the focusing lens onto the workpiece. In some cases, the laser beam is deflected off one or more remotely located mirrors prior to its being directed through the focusing lens onto the workpiece. A vacuum debris removal system, separate from the laser processing head, is usually employed to collect and remove debris produced by cutting or ablation of the workpiece by the focused laser beam.

The aforementioned nozzle protects the focusing lens from contact by debris that is not taken up by the vacuum debris removal system.

FIG. 1 is a cross-sectional view of a conventional laser processing head. Laser processing head 1 includes a hollow cylindrical lens holder 2 comprising an inner chamber 15 in which a focusing lens 3 is retained by a pair of locking rings 4 and 5. A nozzle 6 is secured onto the outer surface of the holder 2 by an o-ring 7, which seals the chamber 15, and a locking set screw 8. The nozzle 6 includes a tip 9 having a narrow opening 10. A laser beam, optionally reflected from a remotely located mirror (not shown in FIG. 1), is focused by lens 3 and directed through opening 10. Upon exiting opening 10, the laser beam cuts or ablates the required material on the workpiece. As indicated earlier, a vacuum debris removal system (not shown in the drawings) surrounds the nozzle 6 to remove most of the cut or ablated material. However, due to the high velocity of ablated material leaving the surface, the vacuum system surrounding the laser processing head may not remove all the debris and some of it may enter the opening in the nozzle. The nozzle 6 with the narrow opening 10 prevents large pieces of ablated material from being thrown back against the lens. Even with this arrangement, however, contaminants and debris can bounce back off the work surface through the opening 10 damaging the lens and rendering it inoperable.

In an attempt to solve this problem, a system was employed in the prior art to force air or other gases through opening 10 toward the workpiece to prevent particles from being thrown back into the lens holder 2. As illustrated in FIG. 1, the system includes a gas inlet 11 and a circumferential gas chamber 12 in nozzle 6, as well as slots 13 in holder 2. The gas path is shown by reference numeral 14.

While the prior art laser processing head shown in FIG. 1 is adequate for many applications, use of high power lasers removing large quantities of materials from the workpiece surface required an improved system. In such applications, a laser beam having an energy level of 1200 watts and higher is used to ablate materials from a work surface. A conventional laser processing head of the type shown generally in FIG. 1 is inadequate to prevent ablated material from bouncing back through the nozzle opening at high power over an extended period of time. The lens can become coated with contaminants from the work surface. In some instances, this contamination leads to a heat build-up which can crack or otherwise damage the focusing lens. In order to avoid the aforementioned contamination and/or heat build-up it is necessary to periodically interrupt the process and clean the focusing lens. This results in costly down time and reduced operational efficiency.

SUMMARY OF THE INVENTION

The present invention is directed to an improved laser processing head that includes a gas distribution means for introducing gas into the head under pressure adjacent to the lens to prevent the lens from becoming damaged by contaminants or ablated material emanating from the workpiece. The flow of gas, after entering at the lens, is directed away from the lens and towards the nozzle. In one preferred embodiment of the invention, the gas distribution means comprises means for forming a vortex action as the gas enters the head adjacent the lens. The vortex of gas keeps the lens clean and eliminates heat buildup in the lens. The gas vortex creates an additional force which prevents contaminants and ablated material from reaching the lens. The vortex results in the lens being kept clean, cool and damage-free throughout the entire laser operation. In an illustrative embodiment, the vortex action is provided by an annular gas distributor having a plurality of angled slots so that the gas entering the housing in which the lens is mounted enters in a spiral action creating the vortex.

The laser processing head of the present invention, in another preferred embodiment, comprises a nozzle having a body portion that includes a gas inlet opposite a gas outlet and an inner chamber tapered from a wide opening at the inlet to a narrow opening at the outlet. The tapered inner chamber provides for gas flow from a wide opening to a narrow opening which results in an increased velocity of the gas flow as it exits the narrow opening. The increased velocity acts to prevent contaminants and ablated material from bouncing back through the nozzle and reaching the lens.

DETAILED DESCRIPTION OF THE DRAWINGS

Figure 1:
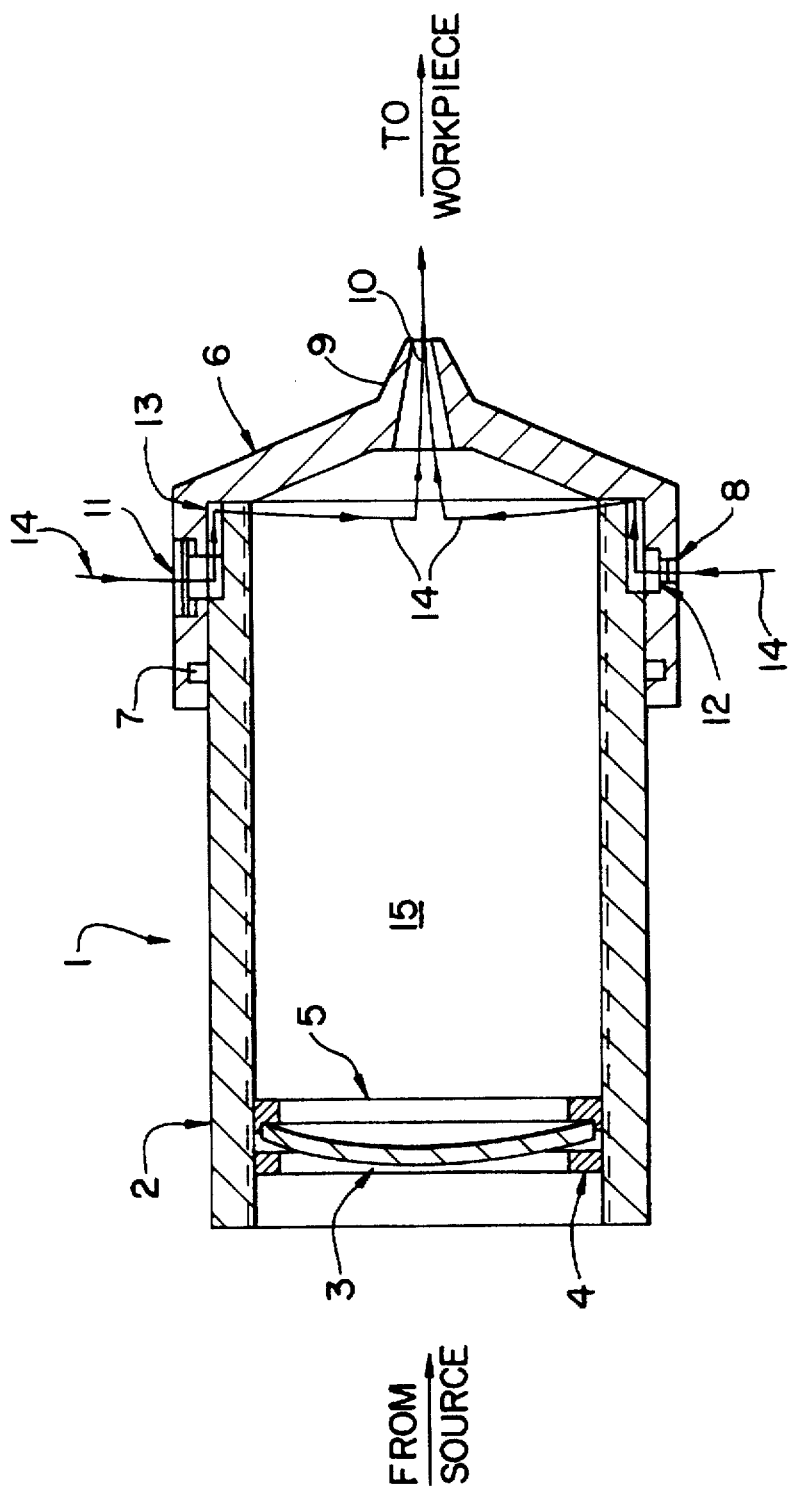
FIG. 1 is a cross-sectional diagram of a prior art laser processing head.
Figure 2:
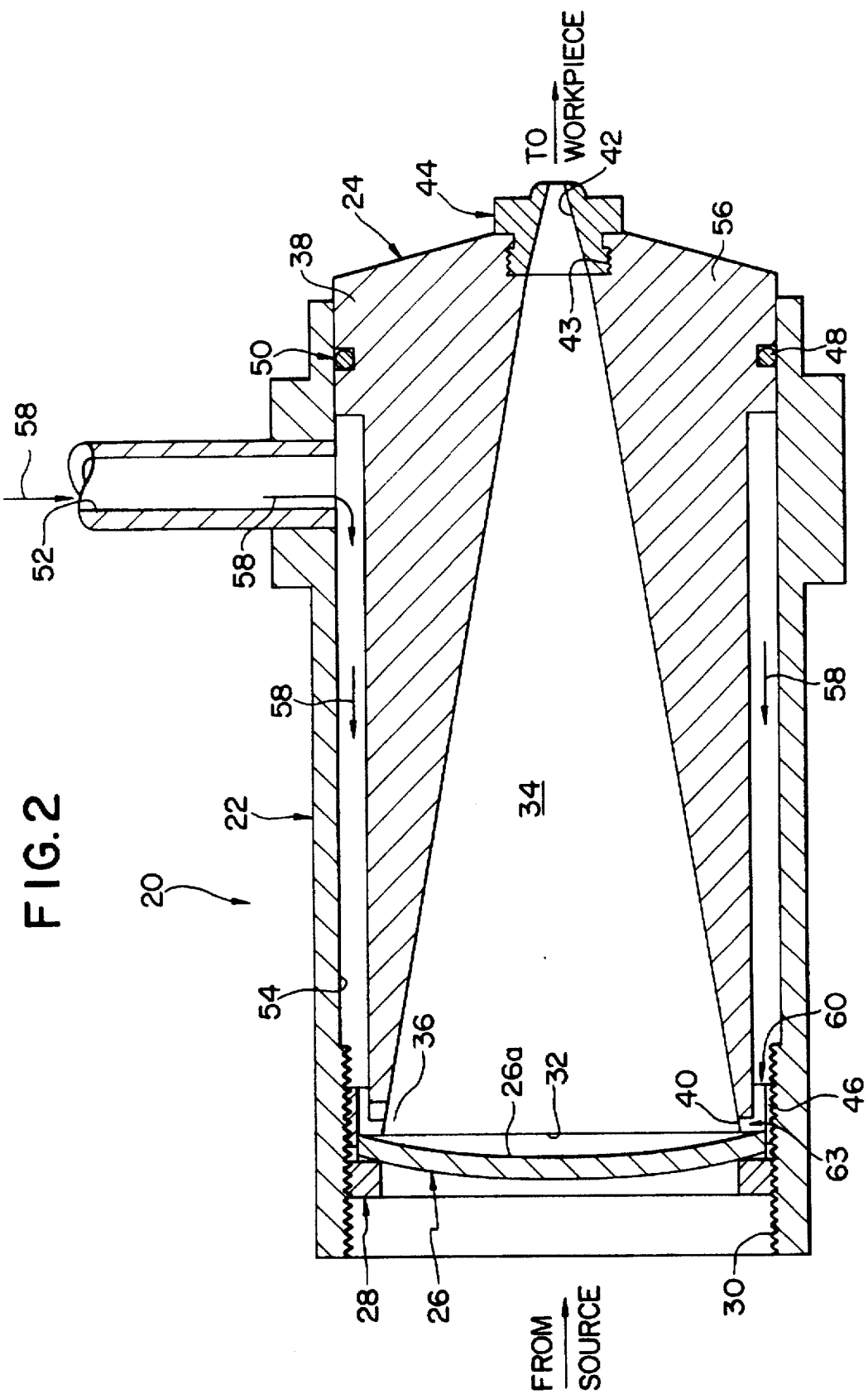
FIG. 2 is a cross-sectional diagram of a laser processing head of the present invention.

Referring now to FIG. 2, the improved laser processing head 20 of the present invention is comprised of an assembly that includes an outer housing 22 and an inner lens holder-nozzle 24. A laser focusing lens 26 is disposed within outer housing 22 at one end thereof. As shown in FIG. 2, lens 26 is retained in outer housing 22 by means of an outer locking ring 28 that threads into threads 30 on the inner diameter of the outer housing 22. The lens 26 is retained on its inner surface by the inlet end 32 of lens holder-nozzle 24. While the lens 26 may be retained on its inner surface by another locking ring or other suitable retaining member, the advantages of the present invention are best achieved by the lens being retained on its inner surface by the lens holder nozzle 24.

The lens holder-nozzle 24 shown in FIG. 2 is a preferred embodiment thereof that includes a tapered inner chamber 34 and a gas distributor 36 at inlet end 32. The inner chamber 34 is formed by tapered body portion 38 and provides a wide inlet opening 40 and a narrow outlet opening 42. The embodiment shown in FIG. 2 includes a removable tip 44 shown in this embodiment as being threaded into opening 43. The removable tip 44 is an optional feature. Advantageously, tip 44 may be threaded into or out of opening 43 in lens holder-nozzle 24 to adjust the clearance from the front surface of tip 44 to the surface of the workpiece.

Lens holder-nozzle 24 is retained within cylindrical housing 22 by means of a threaded flange 46 that mates with interiorly located threads 30 in housing 22. In addition, an annular slot 48 contains an o-ring seal 50 to provide an gastight seal at the outlet end between the housing 22 and lens holder-nozzle 24.

Housing 22 further includes a gas inlet 52. A gas passageway 54 is formed between the inner surface of housing 22 and the outer surface of lens holder 24. Flange 56 and o-ring 50 prevent gas from escaping at the outlet end of the nozzle 24 so that the flow of gas, as shown by arrows 58, is initially directed toward the inlet end 32 of lens holder nozzle 24.

Figure 3:
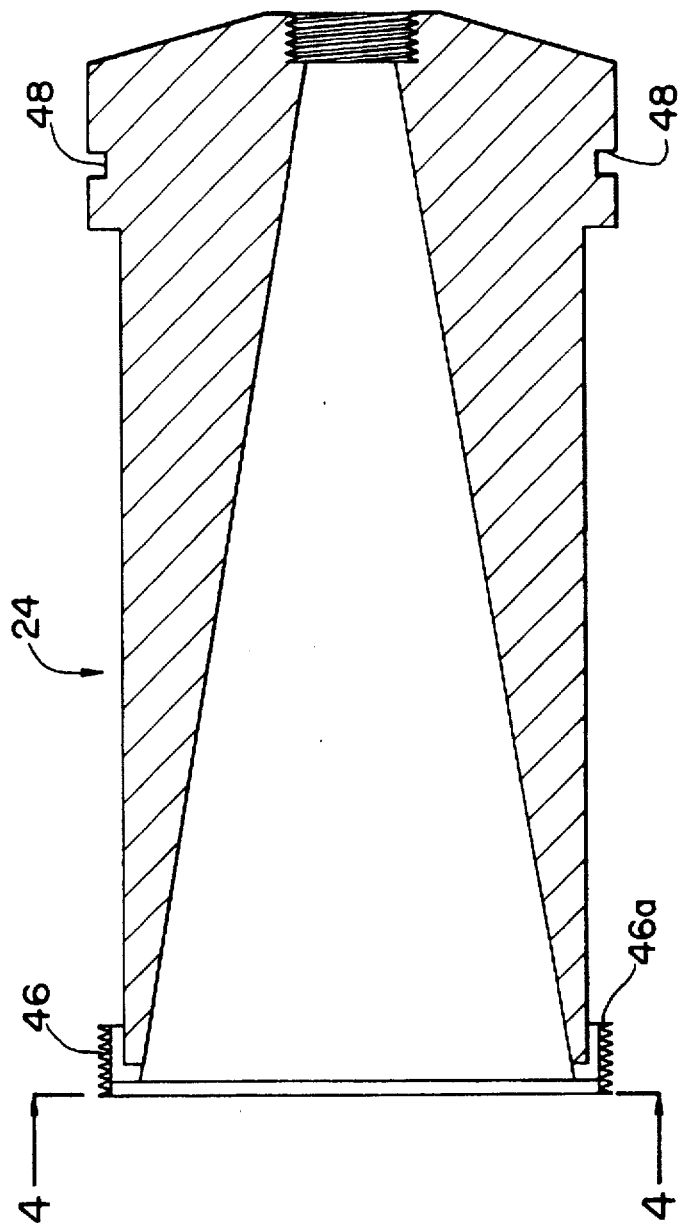
FIG. 3 is a cross-sectional diagram of the lens holder portion of the laser processing head of FIG. 2.
Figure 4:
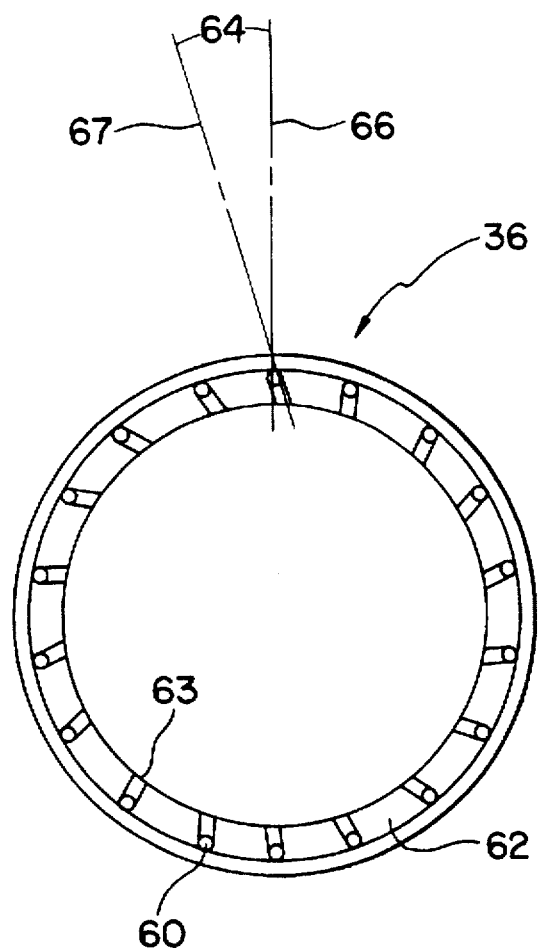
FIG. 4 is an end view of the gas distributor taken along lines 4—4 of FIG. 3.

The laser processing head of the present invention further comprises an annular gas distributor 36 for receiving gas from passageway 54 and directing said gas first across the inner face 26a of focusing lens 26 and thence through chamber 34 from inlet end 32 toward opening 42 where it exits laser processing head 20. Thus it will be understood that gas distributor 36 provides for the passage of gas from the passageway 54 into the chamber 34. Gas distributor 36 includes distribution holes 60 spaced around the circumference of distributor 36. The annular gas distributor 36 is formed by a ring 62 having distribution holes 60 each of which is in gas communication with a plurality of distribution slots 63. In a preferred embodiment shown in FIG. 4, the longitudinal axis 67 of each slot 63 forms an angle 64 (measured at the outer surface of ring 62) with an extension 66 of the radius of the ring 62. The gas distributor 36 is preferably an integral portion of the lens holder 24. However, alternatively, the distributor may be a separate member that is secured to the inlet end of holder 24. Specifically, gas distributor 36 is preferably provided as an integral part of threaded flange 46 of lens holder-nozzle 24. In other words, in the preferred embodiment, threaded flange 46 functions as the aforementioned ring 62. In this arrangement, a series of circumferentially disposed distribution holes 60 are provided in flange 46. The axes of these distribution holes 60 are generally parallel to the longitudinal axis of laser processing head 20 and generally perpendicular to the interiorly disposed surface 46a of threaded flange 46 (See FIG. 3). Distribution slots 63 provide gas communication between distribution holes 60 and chamber 34.

The introduction of the gas, first, adjacent the lens holding arrangement, and second, by means of angled slots 63 creating a vortex action across the inner surface of the lens, prevents the lens 26 from becoming damaged or contaminated by ablated particles from the workpiece. The vortex of gas flow cleans the lens and prevents heat buildup in the lens 26 by removing heat by forced convection. The gas flow is directed towards the nozzle outlet 42. This prevents particles and contaminants from reaching the lens 26 thereby significantly extending the life of the lens.

There are two variables that should be controlled in order to achieve optimum performance from the laser processing head of the present invention. These are the size of the narrow outlet opening 42 and the gas pressure in the laser processing head during operation. The narrow outlet opening should be as small as possible to minimize the exposure of the lens to contaminants and debris, but it must be large enough to accommodate the diameter of the laser beam as it exits the processing head. An unnecessarily large outlet opening may require excessive gas flows in order to operate effectively. For a given outlet opening, the gas pressure should be high enough to generate sufficient gas flow to cool the lens and to prevent it from being contaminated by ablated particles and contaminants. For the laser processing head of the present invention utilizing a five-inch focal length lens 26, an outlet opening of 0.093" and a gas pressure of 75 psig in the laser processing head were found to permit the processing head to operate for long periods of time without interruptions for required lens cleanings. It will be recognized that the skilled art worker may readily establish other suitable combinations of outlet opening size and gas pressure by routine experimentation.

In order to accommodate minor variations of focal lengths of lenses of a given nominal focal length without the need for removing the lens from housing 22, tapered body portion 38 can be turned, either clockwise or counter-clockwise, to adjust the position of the lens within outer housing 22. When tapered body portion has been turned to its desired position, outer locking ring 28 is correspondingly adjusted to ensure that lens 26 is held securely in position.

Having now described the invention in specific detail and exemplified the manner in which it may be carried into practice, it will be readily apparent to those skilled in the art that innumerable variations, applications, modifications and extensions of the basic principles involved may be made without departing from its spirit and scope.

What is claimed is:

1. A laser processing head comprising:

a housing;

means for holding a focusing lens within said housing at a first end of said housing such that an inner surface of said lens faces an interior of said housing;

a nozzle attached to said housing and having a gas outlet at an opposed second end of said housing; and an annular gas distributor disposed on said first end for introducing a flow of gas into said housing, said annular gas distributor having a plurality of slots pointed at said lens and angled with respect to the central radial axis of said gas distributor extending through each slot to direct a vortex gas flow to contact and flow across the inner surface of said lens positioned in said holding means to provide a lens cleaning action and to direct said vortex gas flow toward the nozzle to prevent back spattering of particles, said gas distributor being supplied with gas by a gas inlet adjacent to said second end and a gas passageway connecting said gas inlet to said gas distributor on said first end.

2. The laser processing head of claim 1 wherein said nozzle comprises a body portion having a gas inlet opposite said gas outlet and an inner chamber tapered from a wide opening at said inlet to a narrow opening at said outlet.

3. The laser processing head of claim 2 wherein said nozzle includes a removable tip at said outlet end.

4. The laser processing head of claim 1 wherein said angled slots have one wall flush against said inner surface of the lens.

5. A laser processing head comprising:

a cylindrical housing having a gas inlet and opposed open ends;

an elongated cylindrical nozzle adapted to fit within and being secured to said housing, said nozzle having a tapered inner chamber providing gas communication between a relatively wider opening at an inlet end and a relatively narrower opening at an outlet end;

a gas distributor forming the inlet end of said nozzle;

a gas passageway being formed between said housing and said nozzle providing gas communication between said housing gas inlet at said exit end, and said gas distributor at said inlet end; and means for securing a focusing lens within said housing flush against said distributor said gas distributor comprises means for forming a vortex action of gas flowing in contact with and across the inner surface of a lens positioned in said securing means and flowing from said inlet end to said outlet end of said nozzle.

6. The laser processing head of claim 5 wherein said gas distributor comprises an annular gas distributor having a plurality of slots angled with respect to a central radial axis of said gas distributor extending through each slot.

7. The laser processing head of claim 6 wherein said gas distributor is an integral portion of said nozzle at the inlet end of said nozzle.

8. The laser processing head of claim 6 wherein said slots are pointed toward said lens.

9. The laser processing head of claim 8 wherein said angled slots have one wall flush against said inner surface of the lens.

10. The laser processing head of claim 5 wherein said means for securing a lens in said housing comprises a lens slot formed between a locking ring and said inlet end of said nozzle.

11. The laser processing head of claim 5 wherein said nozzle includes a removable tip at said outlet end.

12. A method of laser processing a workpiece comprising:

providing a laser for focusing a laser beam onto a workpiece;

directing a laser beam through a focusing lens onto said workpiece;

suppling gas to a gas distributor adjacent to said focusing lens via a gas inlet, remote from said focusing lens, and a gas passageway connecting said gas inlet to said gas distributor;

directing a vortex flow of gas to contact and flow across a surface of said lens facing the workpiece; and directing said vortex flow of gas toward said workpiece.

13. The method of claim 12 wherein said vortex action is directed away from said lens toward the workpiece.

14. The method of claim 13 further including the step of providing an annular gas distributor for creating the vortex action.

15. The method of claim 14 further including the step of providing said annular gas distributor having a plurality of slots angled with respect to a central radial axis of said gas distributor extending through each slot.

16. The method of claim 13 further including the step of mounting said lens in a housing-nozzle assembly having a tapered inner chamber, and wherein said gas flow is directed through said tapered inner chamber.

17. The method of claim 12 further including the step of mounting said lens in a housing-nozzle assembly having a tapered inner chamber.

* * * * *

UNITED STATES PATENT AND TRADEMARK OFFICE
CERTIFICATE OF CORRECTION

PATENT NO. : 5,756,962
DATED : May 26, 1998
INVENTOR(S) : William James, et al.

It is certified that error appears in the above-identified patent and that said Letters Patent is hereby corrected as shown below:

<u>Column 6,</u>
Line 32, Claim 16: "step of mounting said lens in a housing-nozzle assembly" should read --steps of providing said housing having--
Line 35, Claim 17: "step of mounting said lens in a housing-nozzle assembly having" should read --step of providing said housing having--

Signed and Sealed this

Third Day of July, 2001

*Attest:*

*Attesting Officer*

NICHOLAS P. GODICI
*Acting Director of the United States Patent and Trademark Office*